April 28, 1964  E. T. MARTEN  3,130,768
ANTI-SKID TIRE CLAMP
Filed Sept. 14, 1962  2 Sheets-Sheet 1

INVENTOR.
Eitel T. Marten
BY John A. Hamilton
Attorney.

INVENTOR.
Eitel T. Marten
BY John A. Hamilton
Attorney.

United States Patent Office 3,130,768
Patented Apr. 28, 1964

3,130,768
ANTI-SKID TIRE CLAMP
Eitel T. Marten, Hope, Kans.
Filed Sept. 14, 1962, Ser. No. 223,621
6 Claims. (Cl. 152—218)

This invention relates to new and useful improvements in anti-skid, traction-aiding devices for automotive vehicles. It relates still more specifically to a device intended primarily for use in freeing vehicles which have become mired or stuck in mud, soft snow, sand, loose earth or the like, and is not intended for use on slick, hard surfaces such as icy roadways, although with minor modifications it could be adapted for this use.

The principal object of the present invention is the provision of a device of the character described which may be applied and removed easily and conveniently by a single person, in a matter of seconds. No parts need be passed under the wheel, so the vehicle need not be jacked up or rolled onto the device as is often the case with standard tire chains. Also, no access to the inner face of the wheel is required for the purpose of making or breaking connections, so that soiling of the operator's clothes in lying down on the ground and reaching behind the wheel is avoided.

To these ends, my invention comprises a rigid tire clamp consisting of a pair of J-shaped hooks disposed in opposed relation with their longer legs in longitudinal sliding engagement with each other. One of said J-hooks traverses the tread surface of the tire of the automotive vehicle wheel, and is provided with projections which engage the road surface, and the other J-hook engages a specially formed lug nut which is substituted for one of the regular lug nuts securing the wheel to the brake drum. The longer legs of the J-hooks are disposed adjacent each other at the outer face of the wheel for relative longitudinal sliding movement, and are connected together by a novel toggle mechanism operable to draw the bight portions of the J-hooks closer together to grip the tire and the lug nut tightly to secure the clamp in place. Also, the toggle mechanism is resiliently yieldable, to permit the clamp to shorten to compensate for compression of the tire as that portion of the tread engaged by the clamp contacts the ground. The toggle mechanism is operable entirely from the outer face of the wheel, so that the clamp may be applied or removed without access to the inner face of the wheel, and with extreme speed and convenience.

Other objects are simplicity and economy of construction, efficiency and dependability of operation, and adaptability for use with automotive wheels of various sizes and designs.

Figures 1, 4, 5:
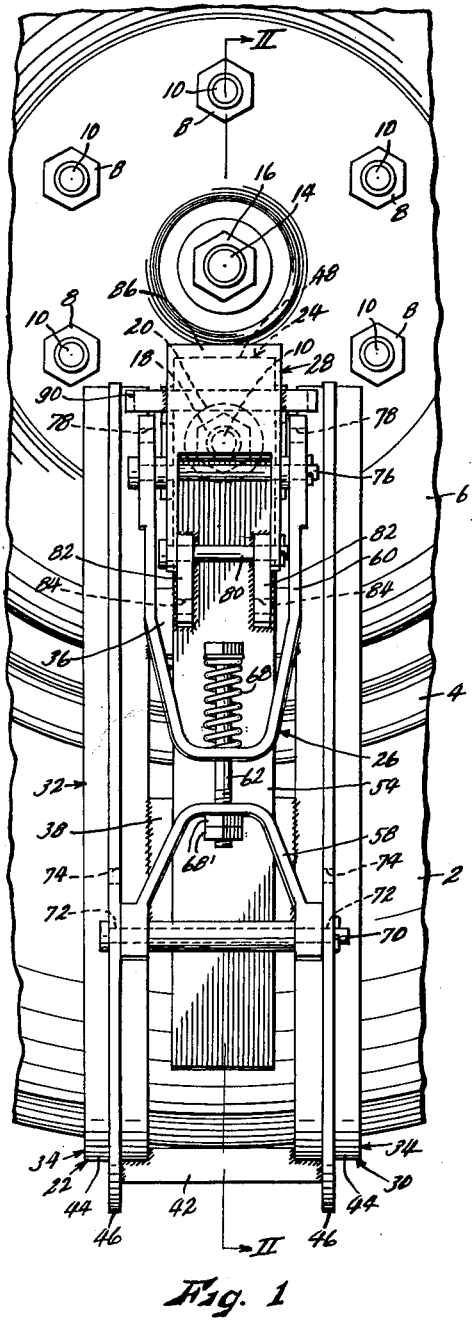
Figures 2, 3:
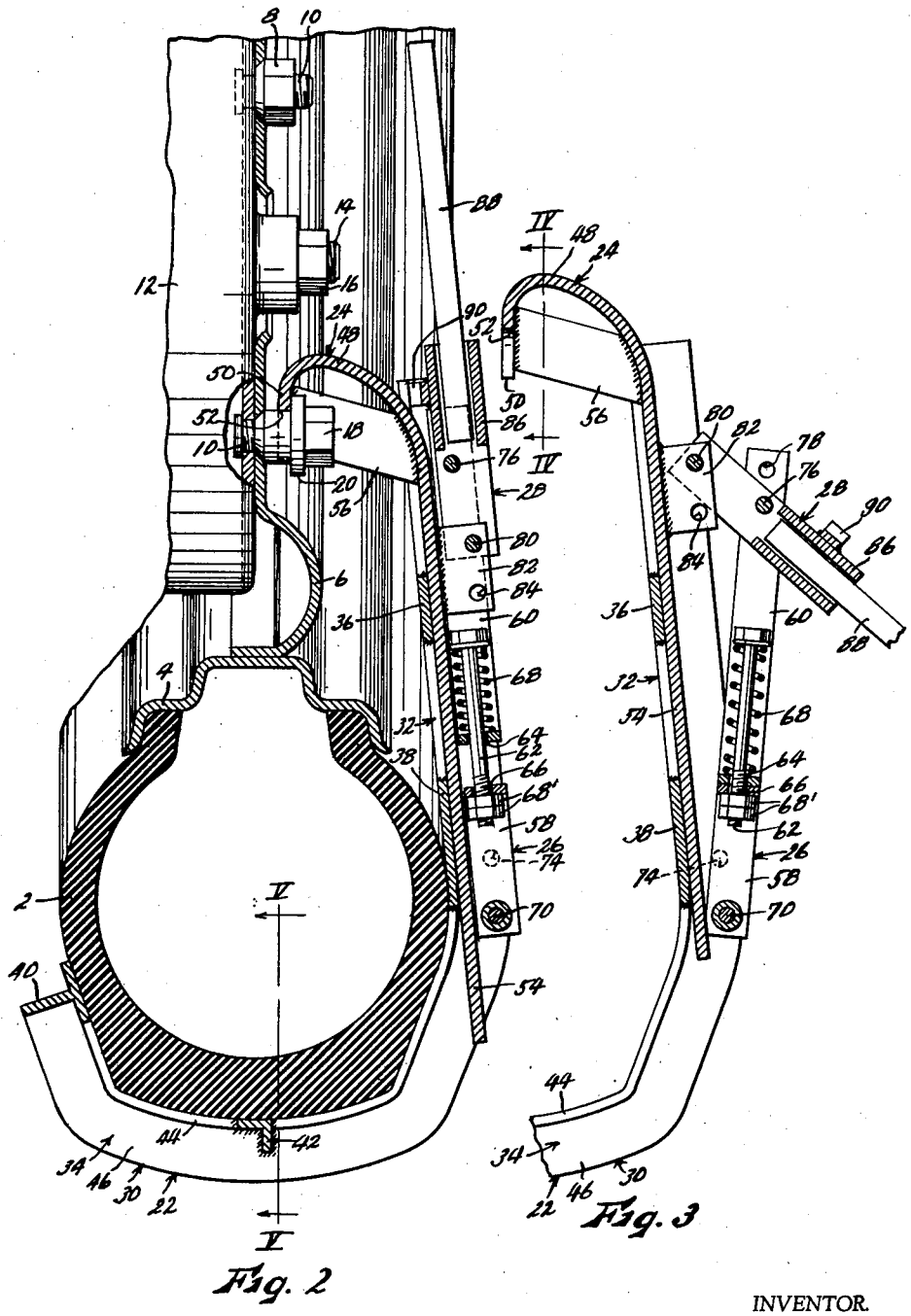

With these objects in view, as well as other objects which will appear in the course of the specification, reference will be had to the accompanying drawing, wherein:

FIG. 1 is a fragmentary side elevational view of an automotive wheel, showing an anti-skid tire clamp embodying the present invention applied operatively thereto, FIG. 2 is a fragmentary sectional view taken on line II—II of FIG. 1, FIG. 3 is a fragmentary view similar to FIG. 2 showing the tire clamp in its released position, FIG. 4 is a sectional view of the clamp taken on line IV—IV of FIG. 3, and FIG. 5 is a sectional view of the clamp taken on line V—V of FIG. 2.

Like reference numerals apply to similar parts throughout the several views and the numeral 2 applies to the tire of an automotive vehicle, said tire being mounted in the usual manner in the wheel rim 4 having affixed therein a rigid wheel disc 6, said disc being secured by a plurality of lug nuts 8 to a like number of threaded lugs 10 which are affixed in the hub member 12, which is usually the brake drum. Said lugs are arranged in a circle concentric with the rear axle 14 of the vehicle, and hub 12 is secured to said axle by a nut 16. In the present invention, one or more (one as illustrated) of lug nuts 10 is replaced by a special nut 18 which differs from the standard nuts 8 in that it is of longer axial length and is provided intermediate its ends with an outstanding peripheral flange 20, said flange being spaced outwardly from wheel disc 6.

The tire clamp forming the subject matter of the present invention includes, in addition to the special lug nut 18, a first J-hook 22, and a second J-hook 24, and a pair of toggle links 26 and 28 interconnecting said J-hooks. J-hook 22 has a bight portion 30 which engages and traverses the tread surface of tire 2 and an extended straight leg portion 32 which overlies the outer face of the wheel and is disposed substantially radially thereto. Said hook comprises a pair of spaced apart angle irons 34 of T-shaped cross-sectional contour, the straight leg portions of said angle irons being rigidly connected by cross-bars 36 and 38 welded or otherwise rigidly fixed therebetween, and the bight portions of said angle irons being connected at their extreme ends by a cross bar 40, and connected at the centerline of the tire tread by a cross bar 42. The webs 44 of angle irons 34 forming the heads of the T-shaped cross-sectional contours are disposed to lie substantially flat against the tire, and the webs 46 of angle irons 34 forming the legs of said T-shaped cross-sectional shapes extend radially outwardly from the tire to engage in mud, sand, snow, etc. to provide added traction for the wheel.

J-hook 24 comprises a flat steel bar bent to form a bight portion 48, a short leg 50 having a notch 52 formed therein adapted to engage special nut 18 behind flange 20 thereof as best shown in FIG. 2, and a longer leg 54 lying in longitudinal sliding engagement with longer leg 32 of J-hook 22, more specifically lying in sliding engagement with the outer surfaces of cross bars 36 and 38 of J-hook 22. J-hook 24 is reinforced by a pair of flat brace bars 56 extending between legs 50 and 54 thereof, and welded thereto.

Toggle link 26 comprises a pair of opposed U-shaped members 58 and 60 disposed with their connecting portions adjacent each other and joined together by a bolt 62 extending longitudinally of the link. Said bolt is slidable in a hole 64 provided therefor in members 60 and a hole 66 in member 58. A compression spring 68 is disposed about bolt 62, being compressed between member 60 and the head of the bolt, whereby the link is rendered resiliently extensible. Lock nuts 68' on the bolt permit adjustment of the tension of the spring. The free ends of member 58 of link 26 are pivoted between the webs 46 of angle irons 34 immediately adjacent the bight portion of J-hook 22, by means of a pivot pin 70 extending through holes 72 provided therefor in said webs. An alternative set of holes 74 is also provided in said webs in which pivot pin 70 may be selectively inserted to adjust the clamp for use on wheels of different sizes, as will presently appear. At the opposite end of link 26, the free ends of U-member 60 of the link are pivotally connected by a pivot pin 76 to toggle link 28, intermediate the ends of the latter. Link member 60 is also provided with an alternative set of holes 78, through which pivot pin 76 may be inserted to adjust the clamp for use on wheels of different diameter.

One end of toggle link 28 is connected by a pivot pin 80 to a pair of lugs 82 welded or otherwise affixed to the outer surface of leg 54 of J-hook 24. Said lugs are also provided with an alternative set of holes 84 through which pivot pin 80 may be selectively inserted to adjust the clamp for use with wheels of different diameters. The opposite end of link 28 forms an axially open socket member 86 in which an extension bar 88 may be inserted to provide additional leverage for operating the toggle. It will be understood that all of pivot pins 70, 76 and 80 are parallel with each other.

In use, the hubcap of the wheel is removed and a special lug nut 18 is substituted for one or more of the usual lug nuts 8. The transverse width of the clamp is such, as shown in FIG. 2, that clamps could be applied to alternate lug nuts of the wheel without interference between the inner end portions of the clamps. However, one clamp has been found adequate in most circumstances to perform the desired function of extricating a vehicle having its drive wheels mired in mud, loose sand or snow, or the like, and only one clamp is illustrated in the drawing. While the special nut 18 is longer axially than the standard nut 8, it is not necessary to use or insert longer studs 10. Also, the usual hubcap may be applied over the special lug nuts, when the tire clamp is not in use.

When it is desired to apply the clamp to the wheel, toggle link 28 is pivoted outwardly and downwardly, as indicated in FIG. 3. This moves the bight portion 48 of J-hook 24 upwardly or away from the bight portion 30 of J-hook 22, also as shown in FIG. 3. The bight portion 30 of J-hook 22 is then engaged about the tread of tire 2, and the notch 52 of J-hook 24 is aligned with nut 18. Toggle link 28 is then pivoted upwardly and inwardly toward a position in which it is axially aligned with toggle link 26, extension bar 88 being inserted in socket member 86 to assist in this operation. During the first portion of this movement, the bight of J-hook 24 is moved toward the bight portion of J-hook 22, until notch 52 of the former engages nut 18 behind flange 20 thereof, or between said flange and the disc 6 of the wheel, as shown in FIG. 2. As pivotal movement of toggle link 28 is continued, link 28 is placed in compression while link 26 is tensioned, and link 26 is resiliently extended by the yielding of spring 68. As link 28 approaches the limit of its travel, pivot pin 76 thereof traverses a plane containing the axes of pivot pins 80 and 70. This renders the toggle self-locking, so that no amount of pull on the links can cause the links to pivot outwardly to the release position of FIG. 3. No additional fasteners are required. Excessive inward pivoting of link 28 is prevented by a stop member 90 affixed to said link and adapted to abut J-hook 22 when in the locked position of FIG. 2. When the clamp is locked, extension bar 88 is removed to prevent possible interference thereof with other clamps which may be applied to the wheel.

The tension of spring 68 serves to secure the clamp firmly in place and prevents rattling. Also, said spring absorbs the compression of the tire, and consequent reduction of diameter of the wheel, when that portion of the tire directly engaged by the clamp is in contact with the ground, so that the clamp is not loosened or allowed to disengage from nut 18 due to said reduction of diameter. The clamp may be adjusted for use on wheels of different diameters, or wherein the radial distance between nuts 8 and the tread of the tire is different, by inserting pivot pins 70, 76 and 80 selectively in holes 74, 78 and 84, so that the proper spacing between U-members 58 and 60 of toggle link 26 occurs when the clamp is fully applied, and turning lock nuts 68' to adjust the tension of spring 68. The T-shaped cross-sectional contour of angle irons 34 forming J-hook 22 tends to resist any tendency of said angle irons to "roll" on the tread surface due to the peripheral force applied to the outstanding webs 46 thereof.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An anti-skid tire clamp comprising:
   (a) a first J-hook adapted to engage the tread of the tire of an automotive vehicle wheel with the longer leg thereof overlying a face of said tire,
   (b) a second J-hook disposed in opposed relationship to said first J-hook and with the longer leg thereof disposed in longitudinal sliding engagement with the longer leg of said first J-hook, said second J-hook being adapted to engage a lug nut of the wheel of said vehicle, and
   (c) means joining the longer legs of said J-hook together and operable to draw the bight portions of said J-hooks closer together, whereby said clamp is secured on said wheel.

2. A tire clamp as recited in claim 1 wherein said first J-hook comprises a pair of parallel, spaced apart angle irons of T-shaped cross-sectional contour, and means rigidly connecting said angle irons, the webs of said angle irons forming the heads of said T-shape being coplanar and disposed to lie substantially flat against said tire, and the webs of said angle irons forming the legs of said T-shapes being disposed to extend outwardly in planes at right angles to the plane of said wheel.

3. A tire clamp as recited in claim 1 with the addition of:
   (a) a special wheel lug nut adapted to be substituted for a regular lug nut of said wheel, said special lug nut having a peripheral flange intermediate the ends thereof, said second J-hook being adapted to engage said special lug nut and to be retained thereon by said flange.

4. A tire clamp as recited in claim 1 wherein said means joining said longer J-hook legs together comprises a toggle mechanism consisting of a pair of links pivoted together and pivoted respectively at their opposite ends to said longer J-hook legs at longitudinally spaced apart points thereof, whereby as said links are pivoted to bring all of the pivots thereof toward a coplanar relation, with both of the pivotal connections to said J-hooks at one side of the pivot between said links, the bight portions of said J-hooks are urged toward each other to secure said clamp on said wheel, one of said links being in tension and the other of said links being in compression.

5. A tire clamp as recited in claim 4 wherein as said toggle links approach said securing position, the pivot between said links traverses the plane including the pivotal connections of said links to said J-hooks, whereby said toggle mechanism is rendered self-locking.

6. A tire clamp as recited in claim 4 wherein said tensioned toggle link is resiliently extensible in length, and wherein said toggle links are so proportioned that said tensioned link must be extended as said toggle mechanism is moved toward its securing position.

References Cited in the file of this patent
UNITED STATES PATENTS

| | | |
|---|---|---|
| 1,995,758 | Stokke et al. | Mar. 26, 1935 |
| 2,453,273 | Scott | Nov. 9, 1948 |
| 2,463,605 | Devine | Mar. 8, 1949 |
| 2,990,868 | Steele | July 4, 1961 |